United States Patent Office 3,455,908
Patented July 15, 1969

3,455,908
PSEUDOMERIZATION OF SAPOGENINS
Bradford H. Walker and Howard J. Burke, Kalamazoo, Mich., assignors to The Upjohn Company, Kalamazoo, Mich., a corporation of Delaware
No Drawing. Filed Nov. 13, 1967, Ser. No. 682,559
Int. Cl. C07c *173/06, 167/18*
U.S. Cl. 260—239.55                                5 Claims

ABSTRACT OF THE DISCLOSURE

The pseudomerization of sapogenins such as diosgenin is accomplished by heating them with a carboxylic acid anhydride in the presence of an acid salt of a secondary amine of the formula:

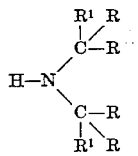

The product, pseudo-sapogenin diester, is an intermediate for the preparation of pregnanes of known utility.

BACKGROUND

Pseudomerization of sapogenins was initially accomplished by Marker by heating with an acid anhydride such as acetic anhydride under pressure at a temperature of about 200° C. The product, pseudosapogenin diester, is a suitable intermediate for the preparation of steroid final products possessing a carbon skeleton characteristic of pregnane. In the case of diosgenin, the steroid product available by this particular series of chemical conversions is 16-dehydropregnenolone.

The reaction exemplifying diosgenin can be represented schematically as follows:

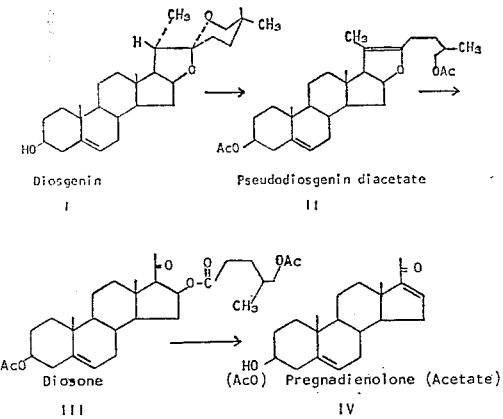

16-dehydropregnenolone in the form of its acetate is a well-known intermediate for the highly useful product, progesterone.

A number of variations of Marker's method of pseudomerization have been suggested, among which are those described in U.S. Patents 3,136,758 and 3,160,626. In the former, the process is carried out in the presence of an acid salt of a tertiary amine catalyst such as the hydrohalides of pyridine or N-methylmorpholine. In the latter the particular use of isobutyric acid or pivalic acid anhydrides is suggested.

The function of the tertiary amines in the above process is referred to as catalytic, but their successfful use has required larger quantities than would be expected for true catalytic function, and has entailed the disadvantages of increased costs and the increased possibility of contaminants in the work-up procedure. Use of stronger secondary amines has been contraindicated because of their propensity to enter into reaction with the acid anhydrides that appear to be essential agents in the pseudomerization reaction.

BRIEF DESCRIPTION

We have discovered that the pseudomerization can be catalyzed using an acid salt, e.g., hydrohalides, such as hydrobromides of a relatively stronger secondary amine which possesses the following structural formula:

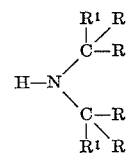

wherein R is a lower alkyl group from 1 to 5 carbon atoms, inclusive, and $R^1$ is H or R. The parametric pairs of R's attached to either one or both of the carbon atoms of the above formula can be joined to each other in an isocyclic ring. For example, suitable secondary amine catalysts (in the form of their hydrohalides) according to the invention are diisopropylamine, dicyclohexylamine, ditertiary-butylamine, tertiary-butylisopropylamine, dicycloalkylamines of the formula:

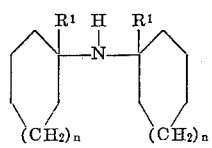

where $R^1$ is as above defined and $n$ is an integer from 1 to 5, inclusive, and alkylcycloalkylamines of the formula:

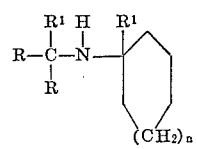

where $R^1$ and $n$ are as above defined, and R is a lower alkyl group of from 1 to 5 carbon atoms, inclusive. According to the invention, the pseudomerization is carried out by heating the sapogenin such as diosgenin at a temperature of about 150° C. or higher in the presence of an excess of an aliphatic acid anhydride such as isobutyric anhydride and in the presence of a small amount (0.15% to 1.5% by weight) based upon the sapogenin, of the secondary amine catalyst of this invention previously described. The temperature can vary up to 200° C. or higher and down to about 150° C. as may suit the particular reactants and other conditions prevailing. The aliphatic carboxylic acid anhydride can be any of the lower aliphatic acids such as acetic acid anhydride, propionic acid anhydride, butyric acid anhydride, isobutyric acid anhydride, pivalic acid anhydride, or the like, up to those containing 8 carbon atoms in the acyl group.

The chemical reaction that is involved in the process of this invention, and in the processes of the prior art, is referred to as "isomerizing" or "pseudomerizing." It is nonetheless a more complicated reaction than either of these two terms suggest. As will be seen from the above equation, it includes the introduction of double bonds, the rupture of rings, and the acylation of hydroxyl groups.

Instead of diosgenin, other sapogenins can be pseudomerized such as, for example, hecogenin, smilagenin, yamogenin and sarsasapogenin.

The process of this invention can be carried out at temperatures of from about 150° C. to about 200° C., the former normally requiring 20-24 hours and the latter 3-6 hours. The lower temperatures (i.e., about 150° C.) enable the reaction to proceed satisfactorily using conventional pressure steam equipment. The amount of the catalyst needed is unexpectedly less than the amounts of tertiary amines needed, and can be from 0.15% to about 1.5% of the weight of the sapogenin.

Recovery of the pseudomerized sapogenin from the reaction mixture and its subsequent use, as noted above, can be accomplished in known manner. The pseudomerization product, such as pseudodiosgenin, can be converted into the desired pregnane series intermediate, such as 16-dehydropregnenolone, without isolation of the form from the pseudomerization reaction mixture.

DETAILED DESCRIPTION

The following specific examples illustrate the invention:

Example 1

When 19 grams of diosgenin acetate were heated under reflux for two hours with 10 ml. of isobutyric anhydride and 30.2 mg. of diisopropylamine hydrobromide, there was no residual diosgenin acetate and the only detected product by vapor phase chromatography analysis was the desired pseudodiosgenin acetate isobutyrate.

Example 2

A slurry of 38 grams of diosgenin acetate was heated at 150° C. with 360 mg. of diisopropylamine hydrobromide in 40 ml. of isobutyric anhydride for 23 hours. The reaction was judged complete, on the basis of thin-layer chromatography. It was oxidized using the same procedure as in Example 4 below and gave 19.47 grams of 16-dehydropregnenolone acetate containing no residual diosgenin acetate.

Example 3

A duplicate of the above run, with 180 mg. of catalyst for 72 hours, yielded on oxidation 19.05 grams of 16-dehydropregnenolone acetate.

The foregoing examples represent embodiments of the invention. Examples 2 and 3 show the further preparation of the intermediate, 16-dehydropregnenolone. The following example is presented for comparison purposes only, and represents the typical prior art process using tertiary amine catalysts.

Example 4 (comparative)

To 38.0 grams of diosgenin acetate was added 0.48 gram of N-methylmorpholine hydrobromide and 20 ml. of isobutyric anhydride. After two hours at a solution temperature of between 184 and 192° C., the reaction mixture was cooled, diluted with benzene and added to a solution of 22.4 grams of sodium dichromate dihydrate in acetic acid. The reaction mixture was heated on a steam bath, the chromium salts removed by water extraction, the benzene was distilled and the product crystallized from methanol, to give 20 grams of 16-dehydropregnenolone acetate, melting at 168-174° C., with $[\alpha]_D$—36° and U.V. a.=25.6.

It was found that we can consistently achieve results of yield and quality of product when compared with those of the prior art process in the presence of less than half, most often approximately one-fourth, of the amine catalyst used in the prior art.

The following table shows the weight yield and physical constants obtained in converting a series of 38-gram portions of diosgenin acetate to 16-dehydropregnenolone acetate. Table I shows the results obtained upon using 120 mg. of diisopropylamine hydrobromide as the catalyst, whereas Table II shows the results obtained upon using four times as much (480 mg.) of the prior art N-methylmorpholine hydrobromide. In each series of experiments the amoutn of isobutyric acid anhydride was 20 ml., and the reaction temperature 190-200° C.

TABLE I

| | Weight yield 16-dehydropregnenolone acetate, percent | Vapor phase chromatographic assay of 16-dehydropregnenolone acetate, percent | M.P. (° C.) | $[\alpha]_D$ (deg.) | U.V. a value |
|---|---|---|---|---|---|
| 1 | 49.8 | 103 | 168-174 | -39 | 26.0 |
| 2 | 51.3 | 101 | 169.5-174.5 | -39 | 27.0 |
| 3 | 50.3 | 101 | 169.5-174 | -38 | 26.7 |
| 4 | 50.8 | 108 | 169-174.5 | -37 | 26.8 |
| 5 | 51.4 | 104 | 169.5-174 | -40 | 26.5 |

TABLE II

| | Weight yield 16-dehydropregnenolone acetate, percent | Vapor phase chromatographic assay of 16-dehydropregnenolone acetate, percent | M.P. (° C.) | $[\alpha]_D$ (deg.) | U.V. a value |
|---|---|---|---|---|---|
| 1 | 49.3 | 102 | 169.5-174 | -39 | 25.7 |
| 2 | 49.6 | 104 | 168.5-174 | -40 | 26.7 |
| 3 | 49.7 | 101 | 169.5-174 | -39 | 26.7 |
| 4 | 50.2 | 103 | 170-174 | -40 | 26.4 |
| 5 | 52.2 | 98 | 160.5-170 | -40 | 25.3 |

We claim:

1. In the method of pseudomerization wherein a sapogenin is converted to the corresponding pseudo-sapogenin by heating with a carboxylic acid anhydride in the presence of an amine hydrohalide catalyst, the improvement which comprises using as an amine hydrohalide catalyst a substance of the following structural formula:

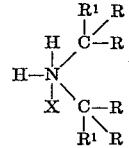

wherein $R^1$ is H or R and R is a lower alkyl group from 1 to 5 carbon atoms, and wherein the parametric R's attached to either one of the carbon atoms shown in the formula can be joined to each other in an isocyclic ring, and X is a halogen.

2. The method of claim 1 in which the sapogenin is diosgenin and the resulting pseudo sapogenin is a pseudodiosgenin diacylate.

3. The method of claim 2 in which the carboxylic acid anhydride is isobutyric acid anhydride.

4. The method of claim 3 in which the amine catalyst is diisopropylamine hydrobromide.

5. The method of claim 3 in which the amine catalyst is dicyclohexylamine hydrobromide.

References Cited

FOREIGN PATENTS 749,697   5/1956   Great Britain.

OTHER REFERENCES

Uhle, F., Journ. Org. Chem., vol. 30, November 1965, pp. 3915-3920.

LEWIS GOTTS, Primary Examiner

260—397.4

U.S. Cl. X.R.